Figure 1:
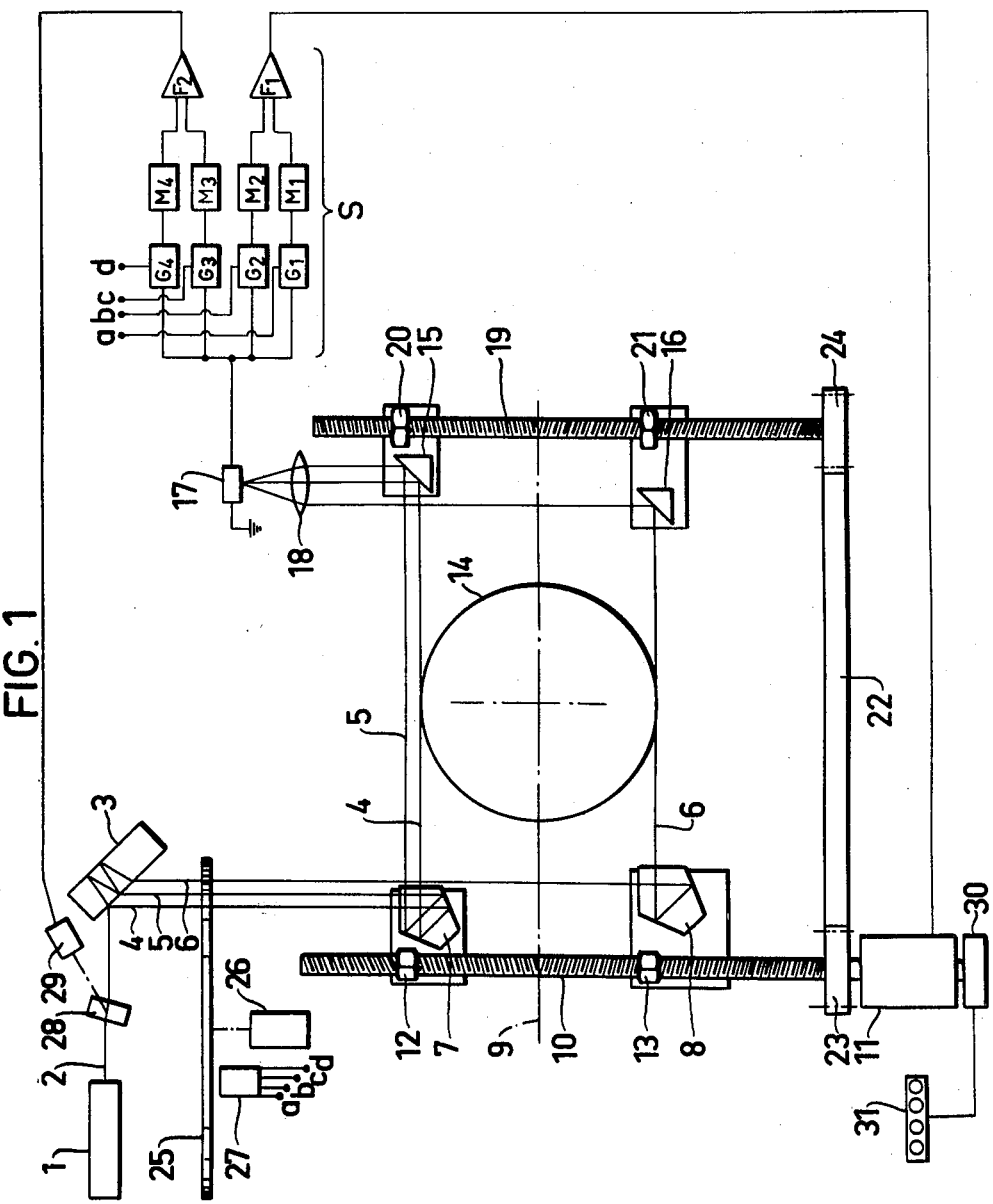

United States Patent [19]

Colding et al.

[11] 3,922,094
[45] Nov. 25, 1975

[54] APPARATUS FOR MEASURING DIAMETER, OUT-OF-ROUNDNESS AND VIBRATION OF AN OBJECT TO BE MEASURED

[75] Inventors: Bertil Colding, Vasteras; Arne Novak, Sollentuna; Unto Sandstrom, Stockholm, all of Sweden

[73] Assignee: Verkstadsteknik AB, Vasteras, Sweden

[22] Filed: Feb. 5, 1974

[21] Appl. No.: 439,744

[30] Foreign Application Priority Data
Feb. 14, 1973  Sweden................. 7302067

[52] U.S. Cl. .............. 356/167; 356/156; 356/160; 250/560
[51] Int. Cl. .......................................... G01b 11/00
[58] Field of Search .......... 356/156, 159, 160, 167; 250/559, 560

[56] References Cited
UNITED STATES PATENTS

| | | |
|---|---|---|
| 2,931,917 | 4/1960 | Beelitz............................ 356/160 X |
| 3,749,500 | 7/1973 | Carlson et al................... 356/160 X |

Primary Examiner—Ronald L. Wibert
Assistant Examiner—Paul K. Godwin
Attorney, Agent, or Firm—Pierce, Scheffler & Parker

[57] ABSTRACT

The invention concerns an apparatus for measuring the diameter, out-of-roundness and position of an object to be measured, in which at least one measuring light beam on each side of the object being measured is directed to run at a distance relative to the other, so that each beam is subjected to a partial screening by the object being measured, said distance being a measure of the diameter, a synchronous translatory motion is imparted to the screened measuring light beams in response to their intensity, with maintained distance relative to each other, for adjusting the measuring light beams symmetrically about the object being measured irrespective of its position in the existing measurement range.

6 Claims, 3 Drawing Figures

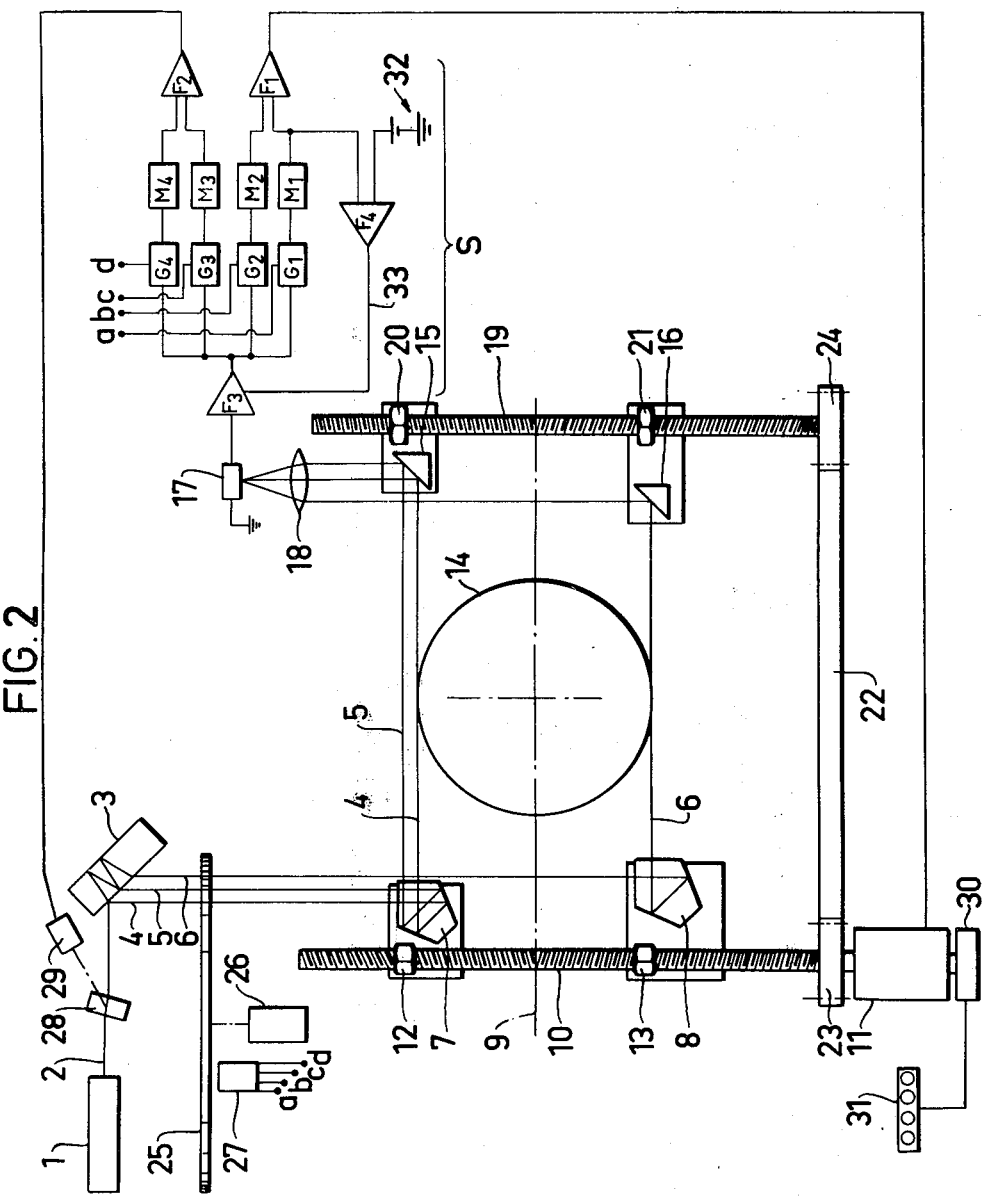

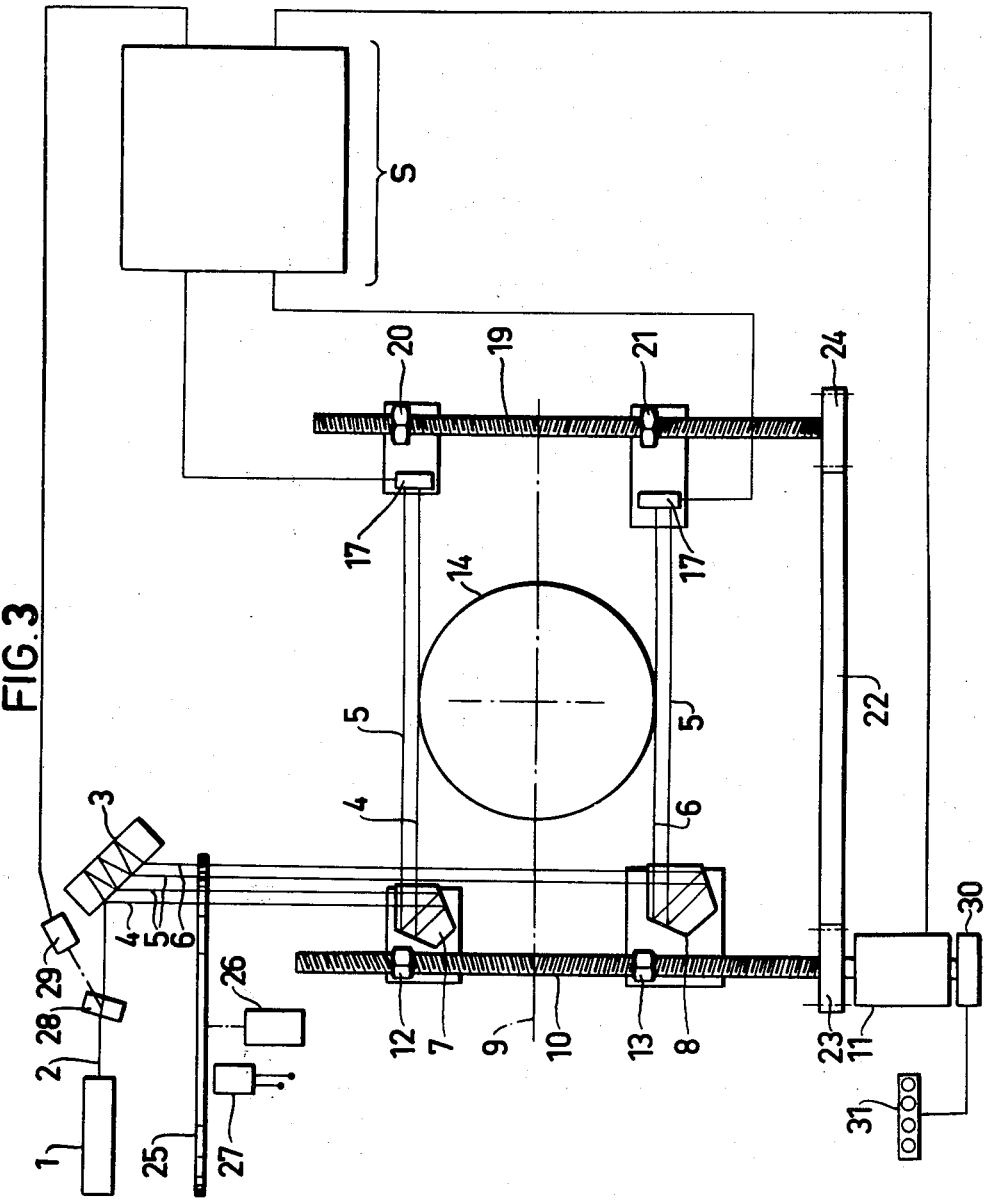

APPARATUS FOR MEASURING DIAMETER, OUT-OF-ROUNDNESS AND VIBRATION OF AN OBJECT TO BE MEASURED

When workpieces with high requirements on dimensional accuracy are being worked, for example, by turning and circular grinding, there is a great demand of diameter measurement value transmitters which can be applied to measurement control of the manufacturing process. Several types of such measurement value transmitters have been in use already for a long time. They comprise two measuring points contacting mechanically opposed places on the workpiece. These measurement value transmitters show the disadvantage that the measuring points are subject to wear and the measuring accuracy is deteriorated by out-of roundness and vibrations. There exist also pneumatic measurement value transmitters having free-blowing nozzles which operate at a distance of about 1 mm from the object being measured and, therefore, are not subject to wear. Both said types have the disadvantage in common that their measurement range is limited to about 1 mm about a preset value. It is, therefore, not possible to move the measuring device along an axle having shoulders or the diameter of which varies in some other way. Keyways and the like can in certain cases render it impossible to perform measurements.

Optical methods for diameter measurement do not show the aforesaid disadvantages, but they, instead, include other weaknesses, due to their design. One example is the method, at which the outline of the object being measured is reproduced on a vidicon tube and the diameter thereafter is determined by analysing the video signal. In this case, the apparatus must have an extremely stable design, because the measurement result is affected by all motions of the optical components relative each other.

At another system, a narrow light beam is moved translatory over the object to be measured, and the distance is measured during which the beam is screened by the object being measured. At this method the object being measured must not move whilst the measurement is being performed.

At a third type of measuring instrument the object to be measured is lighted by two parallel beams, which can be moved translatory so as to light two opposed outlines of the object being measured. The diameter is here a function of the distance of the measuring beams relative one another and of the degree of screening, which is measured. The present invention has as its object to eliminate the weaknesses involved with this last-mentioned methioned method. These disadvantages are primarily as follows: the measurement result depends on the light intensity of the beams. This can be partly compensated for by measuring the intensity of the light source and correcting the measurement result in view of the variations measured. It remains, however, a certain unsafety owing to the necessity of applying separate detectors and amplifiers, which may have a varying sensitivity. Another source of errors is that the positions of the beams usually cannot be adjusted independently of each other, which results in that the central line of the object being measured must coincide with a symmetry axis of the measuring apparatus.

By applying the present invention it is possible to eliminate all sources of errors and, besides, achieve special advantages such as, for example, a simpler and cheaper measuring technique.

The invention, more precisely, relates to a method of measuring the diameter, out-of-roundness and position of an object to be measured, at which method at least one measuring light beam on each side of the object to be measured is directed to run at a distance relative each other so that each beam is subjected to a partial screening by the object being measured, said distance being a measure of the diameter. The method according to the invention is substantially characterized by a synchronous translatory movement of the measuring light beams in response to their intensity, with maintained distance relative each other, for adjusting the measuring light beams symmetrically about the object being measured, independently of the position of the object within the existing measurement range.

The method according to the invention provides the advantage of a simple and cheap distance adjustment between the beams, and that a measuring apparatus or instrument by applying this method becomes insensitive to faulty location of the object being measured. The method and an apparatus utilizing the method can be applied not only to diameter measurement but also to the measurement of out-of-roundness and vibrations. The out-of-roundness is obtained as diameter variations at the rotation of the object being measured. The deflection is obtained as a mean value of the distance through which the two beams have been moved translatory. The vibrations are obtained as the variations in the deflection.

The invention is applicable not only to the measurement of diameter, out-of-roundness and position, but can, for example, also be utilized for measurement control of a manufacturing process.

The invention is described in greter detail in the following, with reference to the accompanying drawing showing in FIGS. 1–3 in a schematic manner three different embodiments of an apparatus according to the invention.

At the embodiments shown, in principle the same basic construction is applied as it is described in the following in connection with FIG. 1.

FIG.. 1 shows a laser 1 emitting a laser beam 2. In a beam divider 3 the laser beam is divided into three parallel partial beams 4, 5 and 6. One of said partial beams, at this embodiment beam 5, is used as reference beam, and the remaining two beams are used as measuring beams. 7 and 8 designate prisms or mirrors capable of moving symmetrically from a line 9. FIG. 1 shows a suitable way of arranging this motion, viz. by means of a double-threaded screw 10 rotated by a servomotor 11, and of the nuts 12 and 13 running on each end of the screw and being connected with each of the prisms 7 and 8. The two measuring beams are deflected by each of the prisms 7 and 8 so as to run in parallel with each other on each side of the object being measured. The reference beam 5 is deflected in the same manner in anyone of the prisms 7 or 8, at this embodiment in the prism 7. Subsequent to their passage of the object being measured, the beams meet the prisms 15 and 16 and are therein deflected in the same direction so as finally to meet a detector 17. It may also be suitable to insert in the beam path immediately before the detector a collecting lens 18 or three optical wedges, by means of which the three beams are caused to meet the same point or area in the detector. The prisms 15 and 16 are so arranged as to move in parallel and synchronously with each of the prisms 7 and 8. FIG. 1 shows a suitable way of arranging this motion, viz. by means of a double-threaded screw 19 and of the nuts 20 and 21, to which the prisms 15 and 16 are fastened. The screw 19 may, for example, be rotated by the screw 10 by means of the toothed belt 22 and gear wheels 23 and 24.

In the beam path, further, a chopper disc 25 is inserted which is rotated by a motor 26. The holes in the chopper disc are so arranged that the three beams are released one by one, and the two measuring beams simultaneously in a definite order. 27 designates a position scanning device, for example a lamp and a photoelectric detector, by means of which the position of the chopper disc is determined, so that it is known at every moment which light beam or beams are passing.

Somewhere in the beam path between the laser 1 and the first prism 7, a plane-parallel glass plate 28 is located, here shown before the beam divider 3. This glass plate can be rotated by a servomotor 29 so that the emitted light is moved translatory through a desired distance.

The measuring apparatus operates as follows:

When the diameter of the object to be measured exceeds the distance between the measuring beams 4 and 6, the beams are entirely screened, and no light meets the photoelectric detector 17. The output signal of the detector then is below a definite value, and a control signal is generated in an electronic equipment S, a signal processing unit described below, so that the servomotor 11 moves the prisms 7 and 8 away from each other, thereby also increasing the distance of the measuring beams relative each other. The motor 11 stops when the measuring beams are partially screened by the object being measured, so that the signal from the detector has a definite value. When the diameter of the object to be measured is smaller than the distance of the beams relative one another, the beams in a corresponding way are moved closer together until the right degree of screening is obtained.

The apparatus strives in this way so to adjust itself that the distance of the measuring beams is equal to the diameter of the object to be measured, which diameter is measured indirectly by measuring the distance of the prisms 7 and 8 relative one another. This measurement can take place, for example, as shown in FIG. 1 by measuring the rotation of the screw 10 by means of a resolver 30 and a display 31.

When the object to be measured is not located centrally between the measuring beams, one of the beams is screened more than the other one. This is indicated in that the measuring beams 4 and 6 periodically are released past the chopper disc 25 one at a time, and the light flow from each beam meeting the detector 17 are compared. The difference signal controls the servomotor 29 so that the glass plate 28 rotates and the light beams are moved translatory until both measuring beams are screened equally. The function of the reference beam is to determine the light intensity of the laser measured by the detector 17. With guidance by this measurement it is determined, which signal strength is to be given by the detector when the two measuring beams are screened correctly by the object being measured.

The electronic equipment S associated with the measuring apparatus may be designed in several different ways, one such equipment being shown in FIG. 1.

In FIG. 1, $G_1 - G_4$ are electric gates, the functions of which are similar to those of usual relays. The control current is supplied through the lines $a - d$, and the gates open upon the supply of control current. $M_1 - M_4$ are memories, the output signal of which has the same size as the input signal supplied last. $F_1$ and $F_2$ are usual differential amplifiers. By means of the position scanning device 27 a control signal is generated in one of the lines $a- d$, depending on which light beam or beams are just passing past the chopper disc 25.

When the path of the reference beam 5 is open, a control signal is generated in the line $a$ which opens the gate $G_1$. The signal from the detector 17 is then led to the memory $M_1$. When the two measuring beams 4 and 6 pass the chopper disc simultaneously, a control signal is generated in the line $b$ which opens the gate $G_2$ so that detector signals are led to the memory $M_2$. In the amplifier $F_1$ the difference between the signals, which have been stored in the memories $M_1$ and $M_2$, is amplified, and this difference signal is supplied to the motor 11, which adjusts the distance of the measuring beams until the difference signal from $F_1$ is zero. The two measuring beams are then so screened by the object being measured that their common intensity upon their meeting the detector 17 is the same as that of the reference beam. This degree of screening is not affected by the laser intensity nor by the sensitivity of the detector.

When one or the other of the measurng beams 4 and 6, respectively, passes the chopper disc, a control signal is generated in the line $c$ and $d$, respectively, so that the gates $G_3$ and $G_4$, respectively, are opened. In the memories $M_3$ and $M_4$ the intensity of each measuring beam is stored, and in the amplifier $F_2$ the difference between them is amplified. The signal from $F_2$ actuates the motor 29, so that the plate 28 is rotated, and the beams are moved translatory until the difference is zero. The object to be measured is then located centrally between the measuring beams. Also this position is unaffected by the intensity of the laser.

In FIG. 2 a more advanced electronic equipment S is shown which, except for the amplifiers $F_3$ and $F_4$ and the normal element 32, is identical with that shown in FIG. 1. The apparatus in its remaining parts agrees with that shown in FIG. 1.

$F_3$ is an amplifier, the amplifying factor of which is controlled by an electric signal supplied through the line 33. $F_4$ is an integrating differential amplifier, one input of which is coupled to a normal element 32 or another constant voltage source. The other input is coupled to the output from the memory $M_1$ and, thus, is supplied with the reference beam signal amplified in $F_3$. In the amplifier $F_4$ the difference voltage between its inputs is integrated and controls the amplifying factor of $F_3$ so that the difference becomes zero. At the output of $F_3$ the electric signal of the reference beam is independent of the light intensity of the laser and the sensitivity of the detector 17. Also the control signals from the amplifiers $F_1$ and $F_2$ are independent of these variations and only proportionally dependent on temporary setting errors of the apparatus in relation to the object to be measured.

The apparatus shown in FIG. 3 differs in principle from that shown in FIGS. 1 and 2 only thereby that a beam divider 3 is provided which divides the beam 2 emitted by the laser 1 into four partial beams, in such a manner, that on each side of the object to be measured 14 are running both a measuring beam 4 and 6, respectively, and an unscreened reference beam 5. The prisms 15 and 16, furthermore, are replaced by detectors 17, in such a manner, that for each group of measuring beam and reference beam a detector is provided, and the detectors 17 are rigidly connected to the nuts 20 and 21. Each detector is connected to an only schematically shown electronic equipment S as signal processing unit.

The chopping device 25 is here so arranged as to release alternatingly the two measuring beams 4, 6 and the two reference beams 5.

In the signal processing unit are formed the total signal from the reference beams 5, the total signal from the measuring beams 4, 6 and the difference between these total signals. This difference is used for automatically adjusting via the motor 11, screw 10 and nuts 12, 13 the measuring beams 4, 6 until the difference is zero.

In the signal processing unit S also the difference signal between the signal intensity of the reference beams 5 and the difference signal between the signal intensity of the measuring beams 4, 6 and formed, which difference between these difference signals is used for controlling via the servomotor 29 and glass plate 28 the translatory motion between the measuring beams 4, 6 whilst maintaining their distance relative each other, until the difference is zero.

The invention is not restricted to the embodiments described above and shown in the drawing, but the method according to the invention and the apparatus for carrying out the method can be varied in several different ways within the scope of the following claims. Instead of the movable adjustment of the measuring beams relative each other as shown and described for obtaining a screening of said beams, for example, a construction can be used, at which the position for the measuring beams is fixed in advance, e.g. by utilizing a gauge. Furthermore, the beams must not necessarily proceed from a single light source, and the various components comprised in the apparatus shown and described can be replaced by other suitable components. What is essential and characteristic of the invention is to produce screened beams and by their translatory motion without changing their distance relative each other to adjust the beams symmetrically about the object being measured irrespective of its position.

What we claim is:

1. An apparatus for measuring diameter out-of-roundness and position of an object to be measured, comprising
    a. means for directing measuring light beams, one on each side of the object, to run at a distance relative one another so that said measuring light beams are subjected to a partial screening by the object;
    b. means for directing at least one reference beam unscreened by the object;
    c. detector means provided in the beam path after the object for detecting the intensity of said measuring light beams and said at least one reference beam after their passage of the object;
    d. signal processing means for processing output signals from said detector means;
    e. control means to be actuated by output control signals from said signal processing means for synchronous translatory motion of said measuring light beams with maintained distance relative each other in order to adjust said measuring light beams symmetrically about the object irrespective of its portion in the existing measurement range; and
    f. means coupled to said signal processing means for permitting the passage of said measuring light beams and said reference beam in a definite order.

2. An apparatus according to claim 1, including means for directing said measuring light beams and said reference beam after their passage of the object to one detector means.

3. An apparatus for measuring diameter, out-of-roundness and position of an object to be measured, comprising
    a. means for emitting one electromagnetic light beam;
    b. means for dividing said light beam into two measuring beams and at least one reference beam;
    c. means for directing said measuring light beams, one on each side of the object, to run at a distance relative one another so that said measuring light beams are subjected to a partial screening by the object;
    d. means for directing said at least one reference beam unscreened by the object;
    e. detector means provided in the beam path after the object for detecting the intensity of said measuring light beams and said at least one reference beam after their passage of the object;
    f. signal processing means for processing output signals from said detector means;
    g. control means to be actuated by output control signals from said signal processing means for synchronous translatory motion of said measuring light beams with maintained distance relative each other in order to adjust said measuring light beams symmetrically about the object irrespective of its portion in the existing measurement range; and
    h. means coupled to said signal processing means for permitting the passage of said measuring light beams and said reference beam in a definite order.

4. An apparatus according to claim 3, including means for directing said measuring light beams and said reference beam after their passage of the object to one detector means.

5. An apparatus according to claim 3, wherein said control means for effecting said translatory motion of the measuring light beams is arranged in the beam path before said beam directing means.

6. An apparatus according to claim 5, wherein said control means is provided in the path of said light beam before the beam dividing means.

* * * * *